(12) United States Patent
Aizawa et al.

(10) Patent No.: US 6,587,419 B1
(45) Date of Patent: Jul. 1, 2003

(54) ELECTRONIC APPARATUS AND APPARATUS FOR RECORDING AND/OR PLAYBACK ON RECORDING MEDIUM

(75) Inventors: Hidekuni Aizawa, Miyagi (JP); Satomi Tanaka, Kanagawa (JP); Kenichi Tamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 59 days.

(21) Appl. No.: 09/595,617

(22) Filed: Jun. 16, 2000

Related U.S. Application Data

(62) Division of application No. 09/101,920, filed on Oct. 15, 1998, now Pat. No. 6,307,743.

(30) Foreign Application Priority Data

Nov. 20, 1996 (JP) ............................................. 8-309795

(51) Int. Cl.$^7$ ............................................ G11B 17/035
(52) U.S. Cl. ..................................................... 369/75.1
(58) Field of Search ............................ 369/75.1, 76, 1; 360/90, 93, 97.01, 99.01, 99.06, 60; 320/15; D18/2; D14/156

(56) References Cited

U.S. PATENT DOCUMENTS

| | | | | |
|---|---|---|---|---|
| D313,018 S | * | 12/1990 | Funabashi | D14/156 |
| 5,166,851 A | * | 11/1992 | Jacobson | 360/137 |
| 5,258,878 A | * | 11/1993 | Araki et al. | 360/60 |
| 5,282,099 A | * | 1/1994 | Kawagoe et al. | 360/900 |
| 5,349,575 A | * | 9/1994 | Park | 369/1 |
| D351,185 S | * | 10/1994 | Matsuda et al. | D10/77 |
| 5,400,185 A | * | 3/1995 | Scerbo, III | 348/143 |
| 5,475,403 A | * | 12/1995 | Havlovick et al. | 346/134 |
| 5,541,809 A | * | 7/1996 | Kakizaki et al. | 361/683 |
| 5,627,450 A | * | 5/1997 | Ryan et al. | 361/686 |
| 5,657,081 A | * | 8/1997 | Kurahashi | 348/233 |
| 6,089,882 A | * | 7/2000 | Costello | 439/95 |
| 6,172,867 B1 | * | 1/2001 | Satou et al. | 312/223.1 |
| 6,307,743 B1 | * | 10/2001 | Aizawa et al. | 361/683 |

\* cited by examiner

*Primary Examiner*—Hoa T. Nguyen
*Assistant Examiner*—Tianjie Chen
(74) *Attorney, Agent, or Firm*—Oblon, Spivak, McClelland, Maier & Neustadt, P.C.

(57) ABSTRACT

An apparatus is provided comprising: a record and/or playback units having a first circuit board provided with a grounding potential unit; a cover body pivotably mounted to the record and/or playback unit and including a shield member connected to the grounding potential unit and a second circuit board connected to the first circuit board; a holder made of a metallic material and arranged to travel between the location for loading a recording medium into the record and/or playback unit and the location spaced away from the record and/or playback unit as the cover body is pivotably moved, and a grounding member made of a metallic material, provided with an engaging portion for engagement with the shield member and a contact for coming into direct contact with the holder, and connected to the shield member to urge the cover body in a direction of the holder pivotably turning. Since the shield member is connected to the grounding member, the circuit board remains connected to the ground thus preventing the apparatus from being statically charged.

3 Claims, 12 Drawing Sheets

ELECTRONIC APPARATUS AND APPARATUS FOR RECORDING AND/OR PLAYBACK ON RECORDING MEDIUM

This is a divisional of application Ser. No. 09/101,920, filed Oct. 15, 1998, now U.S. Pat. No. 6,307,743.

1. Technical Field

The present invention relates to an electronic apparatus such as a disk player, a tape recorder, or a video camera and more particularly, to an apparatus for recording and/or playback, such as a disk player equipped with a recording medium such as an optical disk on which data signals are recorded.

2. Background Art

Electronic apparatuses including a disk player, a tape recorder, and a video camera have been decreased to as a small size as portable.

Such portable electronic apparatuses are minimized in the overall dimensions by reducing the size of its components and electronic device as well as the space where the components are installed. It is further tailored for decreasing the size of an electronic apparatus that an electronic circuit board on which the electronic components are mounted in circuitry arrangements is divided into smaller segments and the space available in the apparatus is filled with the smaller segments.

For example, a disk record and playback apparatus is proposed employing as a recording medium a disk cartridge which has a disk installed therein for recording data signals. In particular, the apparatus comprises a housing which is substantially identical in the size of a plan view to the disk cartridge and a disk record and/or playback assembly accommodated in the housing for recording and/or playing back a data signal on the disk of the disk cartridge.

Although the electronic apparatus such as a disk record and/or playback apparatus has been minimized in the overall size for ease of mobility or portability and is still underway for miniaturization, it is however difficult to maintain the mechanical strength of particular components of which dimensions are decreased to a minimum. Thus, the electronic apparatus composed of such components is hardly ensured in the mechanical strength. Accordingly, it may easily be injured when accidentally dropped down.

It is thus designed for protection of a mechanism where the mechanical strength is insufficient to have a housing which the mechanism and electronic circuit boards are installed made of a material having a proper degree of mechanical strength so that the mechanical strength of the overall construction can be maintained to a level of insurance. The housing made of a material having a higher mechanical strength however results in the increase of the overall weight of the apparatus. The mechanism developed for increasing the mechanical strength will be adverse to decreasing the overall size of the apparatus.

In case that the electronic apparatus includes a set of small sized electronic circuit boards, each composed of a plurality of electronic circuits, for effective use of a limited space in the apparatus, electrical insulation and connection to the ground of its electronic circuits will extremely be troublesome.

If the electrical insulation and connection to the ground of the electronic circuits in the electronic apparatus fail to provide a level of liability, its housing, made of e.g. a synthetic resin material may be assaulted by static electricity thus producing a fault and impairing the electronic circuits.

It is possible for protection of the electronic circuits on the circuit boards to have the circuit boards integrated to a single unit. Although such an integrated form of the circuit boards ensures ease of the electrical insulation and connection to the ground of the electronic circuits its increased size will prevent the apparatus from being minimized in the dimensions.

DISCLOSURE OF THE INVENTION

It is an object of the present invention to provide an electronic apparatus and a recording medium record and/or playback apparatus which are minimized in the overall size and the overall weight but still have an optimum degree of mechanical strength.

It is another object of the present invention to provide an electronic apparatus and a recording medium record and/or playback apparatus which is capable of, when used as a portable or mobile type, having an optimum degree of mechanical strength regardless of being stressed by external impact due to drop-down.

It is a further object of the present invention to provide an electronic apparatus and a recording medium record and/or playback apparatus in which electronic circuits are securely protected.

It is a further object of the present invention to provide an electronic apparatus and a recording medium record and/or playback apparatus in which static charge is prevented from.

For achievement of the objects of the present invention, an electronic apparatus comprises: an upper half and a lower half; a framework; and a circuit board which is substantially equal in the size to the framework and has a degree of rigidity enough to be mounted to one side of the framework, wherein the upper half and the lower half are arranged so as to sandwich and enclose the framework therebetween. As the circuit board is mounted to the framework with a degree of rigidity, the rigidity and mechanical strength of the framework will be increased.

The electronic apparatus may further comprise a strip member mounted to an outer side of the framework. The strip member is located between the upper half and the lower half. The framework is formed of a four-sided shape and arranged movable relative to the strip member.

The electronic apparatus of the present invention may further comprise a base mounted to an inner side of the framework. The framework has at least one pivotal arm pivotably mounted thereto and joined to the upper half so that the upper half can pivotably be turned relative to the lower half.

The framework has a lock member for locking the upper half at its closed position over the framework.

A recording medium record and/or playback apparatus according to the present invention comprises: a record and/or playback units having a first circuit board provided with a grounding potential unit; a cover body pivotably mounted to the record and/or playback unit and including a shield member connected to the grounding potential unit and a second circuit board connected to the first circuit board; a holder made of a metallic material and arranged to travel between the location for loading a recording medium into the record and/or playback unit and the location spaced away from the record and/or playback unit as the cover body is pivotably moved; and a grounding member made of a metallic material, provided with an engaging portion for engagement with the shield member and a contact for coming into direct contact with the holder, and connected to the shield member to urge the cover body in a direction of the holder pivotably turning.

The first circuit board and the second circuit board connected to the first circuit board are electrically shielded by the cover body including the shield member connected to the grounding potential unit. Since the shield member is connected to the grounding member, the apparatus remains connected to the ground thus being prevented from static charging.

The grounding member has a pressing portion thereof for pressing the recording medium against the record and/or playback unit, which prevents from static charging.

In the recording medium record and/or playback apparatus of the present invention, the cover body has a window and at least one operating buttonswitch mounted thereon, and the second circuit board has at least one switch actuated by the action of the operating buttonswitch and a display element provided opposite to the window.

The recording medium record and/or playback apparatus may further comprise a base, a framework on which the base and the first circuit board are mounted, a strip member mounted to an outer side of the framework, and a half accommodating the framework, wherein the strip member is located between the cover body and the half when the cover body is closed over the half.

The framework has at least one pivotal arm pivotably mounted thereto and joined to the cover body and a lock member for locking the cover body at its closed position over the half.

A recording medium record and/or playback apparatus according to the present invention is provided comprising: a main body including a recording medium record and/or playback units; and a cover body pivotably mounted to the main body and having at least one operating buttonswitch mounted on an upper side thereof, wherein the main body includes an opening for loading of a battery, a storage for storing the battery loaded through the opening, and a battery cover for opening and closing the opening, wherein the storage is formed by the main body bulged downwardly at its lower side. The storage is bulged downwardly from the lower side of the main body. This allows the apparatus to be tilted when placed with its storage at bottom thus contributing to the improvement of the operability of an operating section of the cover body.

The opening for loading a battery is provided in a side of the main body. Also, the battery cover for opening and closing the opening is pivotably mounted on the main body with one end of the opening designated as the pivotal base.

The recording medium record and/or playback apparatus of the present invention may further comprise a holder arranged to travel between the location for recording medium record and/or playback and the location spaced away from the location for recording medium record and/or playback as the cover body is pivotably moved.

A recording medium record and/or playback apparatus according to the present invention is provided comprising: a main body including an upper half, a lower half, and a recording medium record and/or playback unit which are arranged to substantially a rectangular parallelopiped shape, the lower half having an opening provided in a side thereof at a corner for loading a battery and the opening being opened and closed by the action of a battery cover pivotably mounted to the side of the lower half; and a holder mounted to the main body for traveling between the location of loading a recording medium onto the record and/or playback unit and the location spaced away from the record and/or playback unit. The main body includes a base on which the record and/or playback unit is mounted, a framework joined to the base and accommodated in the lower half, and a strip member mounted to an outer side of the framework. The main body also includes a circuit board mounted to a lower side of the framework.

The apparatus may further comprise a cover body arranged for movement relative to the main body as the holder is pivotably moved, and provided with at least one operating buttonswitch on the upper side thereof. The cover body has a display mounted on the upper side thereof.

Other objects and practical advantages of the present invention will be apparent from the following description of preferred embodiments.

BEST MODE FOR CARRYING OUT THE INVENTION

Figure 1:
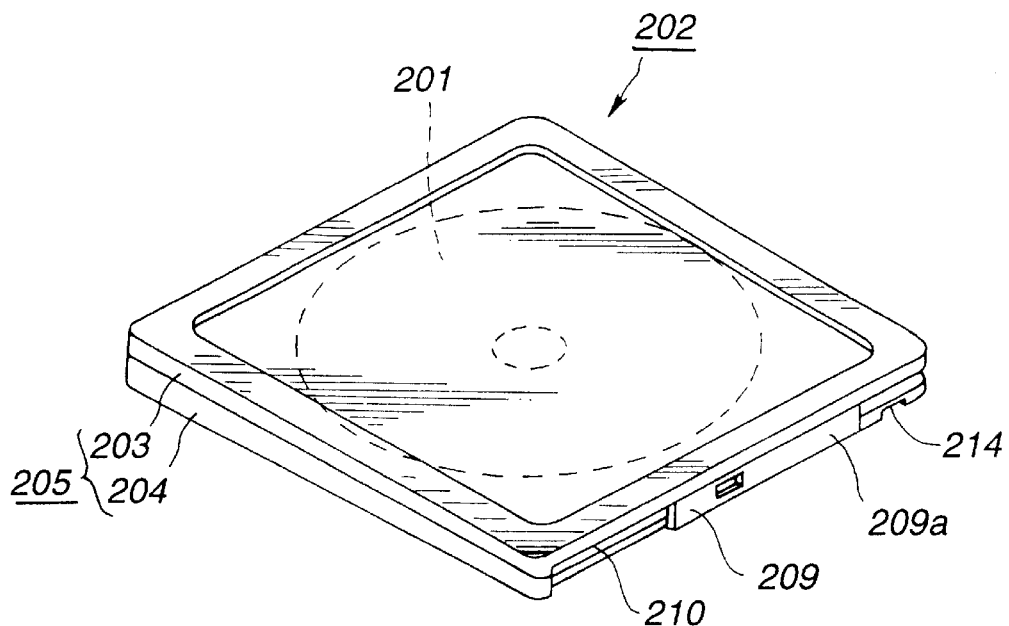
FIG. 1 is a perspective view, from above, of a disk cartridge of playback type used in a disk player according to the present invention.

An electronic apparatus according to the present invention will be described referring to the drawings.

This embodiment explained below is particularly applied to a disk player employing an optical disk as the recording medium on which data signals are recorded and arranged for playback of a data signal such as an audio signal from the optical disk.

Prior to the description of the disk player of the embodiment, the disk cartridge used as the recording medium in the disk player is explained.

The disk cartridge used in the disk player of the embodiment may be classified into two types; one with an optical disk carrying data signals such as audio signals and used for playback only and the other with an optomagnetic disk used for both record and playback of data signals such as audio signals.

Figure 2:
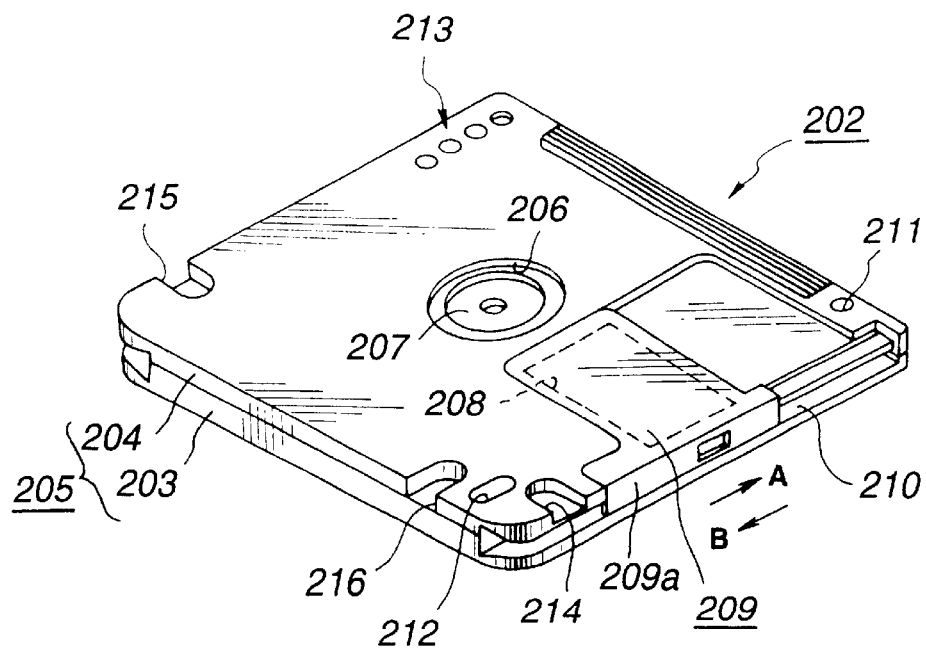
FIG. 2 is a perspective view, from below, of the disk cartridge.

The disk cartridge 202 including an optical disk of a playback type 201 has a cartridge body 205 thereof composed of a pair of upper and lower halves 203 and 204 butt-joined to each other, as shown in FIGS. 1 and 2. The cartridge body 205 is formed of a square shape having a circle of the outer edge of the optical disk 201 inscribed therein so that the optical disk 201 is rotatably accommodated in a disk storage of the cartridge body 205.

The lower half 204 of the cartridge body 205 has a center aperture 206 provided in the center thereof for accepting a disk table which is mounted in the disk player for rotating the optical disk 201 accommodated in the cartridge 205. Also, a hub 207 provided in the center of the optical disk 201 is lodged in the center aperture 206 for clamping the optical disk 201 to the disk table.

As best shown in FIG. 2, the lower half 204 has a playback opening 208 provided therein for exposing a portion of the optical disk 201 radially and outwardly. The opening 208 extends from near the center aperture 206 to one side of the cartridge body 205. The opening 208 allows a portion of the optical disk 201 to be exposed and accessed by an optical pickup mounted on the disk player when the disk cartridge 202 is loaded to the disk player.

The cartridge body 205 has a shutter 209 mounted for opening and closing the playback opening 208. The shutter 209 has a slide guide 209a formed at the proximal end thereof for engagement with a slide guide groove 210 provided in the side of the cartridge body 205 so that it can move in both directions denoted by the arrows A and B in FIG. 2 to open and close the opening 208. When the shutter 209 is in its close location to close the opening 208, it is locked to a shutter lock member of the cartridge body 205 for not departing from the close location. As the disk cartridge 202 has been loaded into the disk player, the shutter 209 at its close location to close the opening 208 is unlocked by a shutter release member mounted adjacent to the slide guide groove 210 in the disk player. More specifically, the shutter 209 is urged by the shutter release member and moved in the direction denoted by the arrow A in FIG. 2 thus exposing the opening 208.

For the purpose, the disk cartridge 202 is loaded and unloaded on the disk player with the side of its cartridge body 205, along which the shutter 209 is slid, held at a right angle to the loading side of the disk player.

Moreover, the lower half 204 has a pair of positioning slots 211 and 212 provided therein for accepting positioning pins mounted on the disk player when the disk cartridge 202 is loaded into the disk player. The paired positioning slots 211 and 212 are located on both sides of the playback opening 209 respectively. With the paired positioning slots 211 and 212 engaged with the positioning pins, the disk cartridge 202 is horizontally aligned and placed in a cartridge loading section of the disk player.

In the other end of the side of the lower half 204 opposite to the shutter 209 end, a plurality of disk identification apertures 213 are provided for detecting a type of the optical disk loaded.

Also engaging recesses 214 and 215 for engagement with parts of a disk exchange mechanism in the disk player are provided in the two sides of the cartridge body 205 perpendicular to the front or loading side. The loading side of the cartridge body 205 has a recessed cartridge identification 216 thereof which can be detected by an identifying mechanism mounted in the disk player for identifying a type of the disk cartridge 202.

As apparent from in FIG. 1, the upper half 203 of the disk cartridge 202 containing the optical disk 201 of the playback type is sealed in. This is done because a magnetic head for recording data signals in cooperation with the optical pickup is not applicable.

Figure 3:
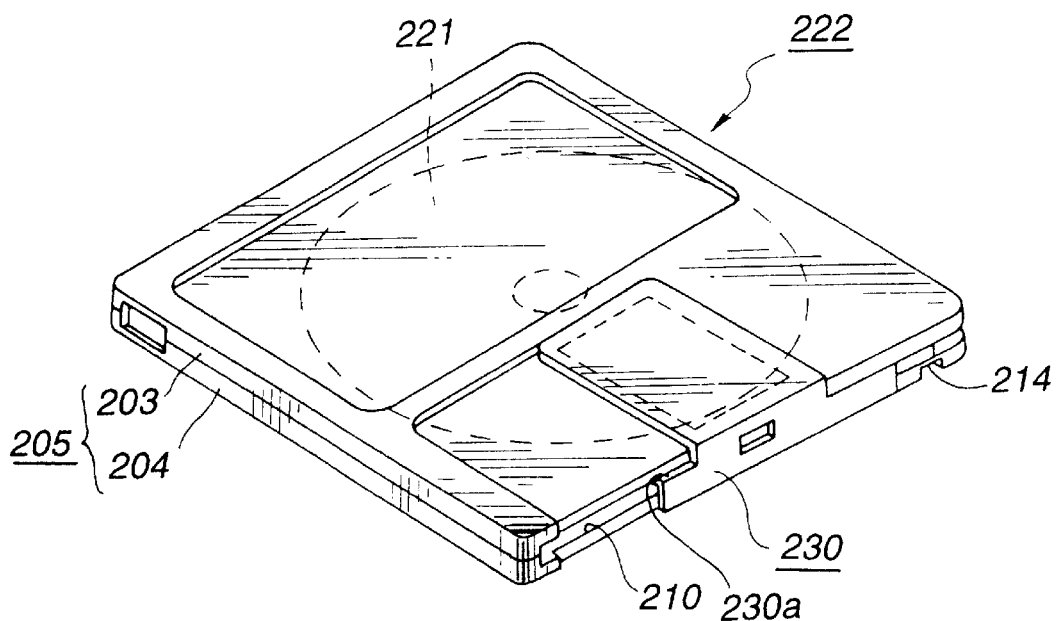
FIG. 3 is a perspective view, from above, of a disk cartridge of record and playback type used in a disk player according to the present invention.
Figure 4:
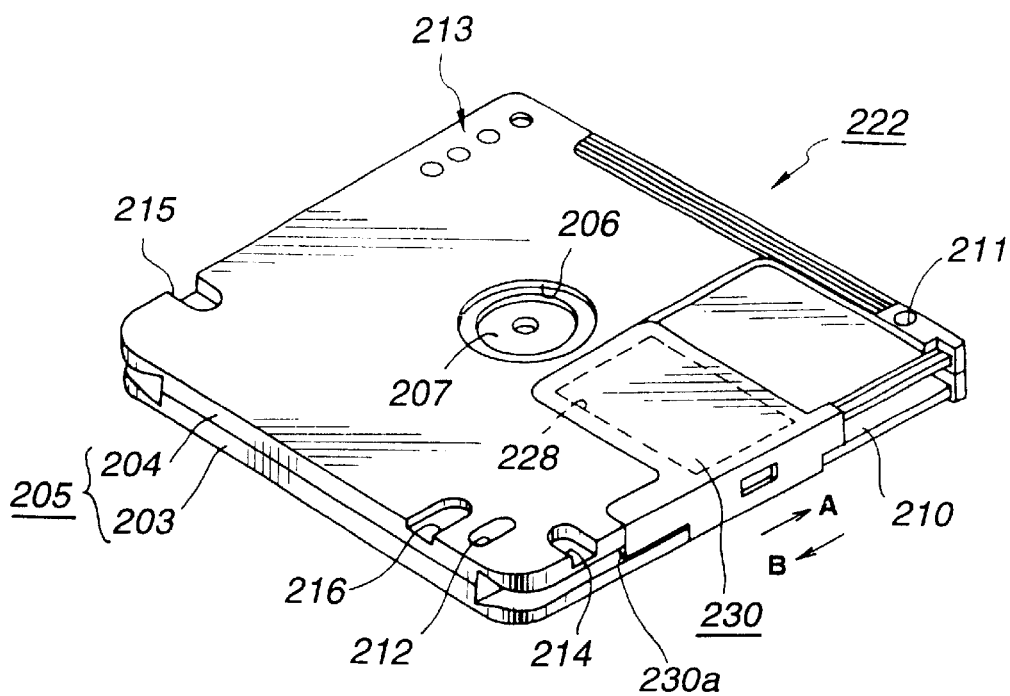
FIG. 4 is a perspective view, from below, of the disk cartridge.

It is true that a disk cartridge 222 containing a optomagnetic disk 221 of a record/playback type for record and playback of data signals such as audio signals is substantially similar in the fundamental arrangement of common components to the disk cartridge 202 containing the optical playback disk 201, as shown in FIGS. 3 and 4. The disk cartridge 222 is now explained referring to FIGS. 3 and 4. Like components are denoted by like numerals as those of the disk cartridge 202 containing the optical playback disk 201 and their explanation will be omitted.

The disk cartridge 222 carrying the optomagnetic disk 221 of the record and playback type has a playback opening 228 provided in a lower half 204 thereof and a recording opening 229 provided in an upper half 203 thereof for allowing the access of a magnetic head to record data signals in cooperation with an optical pickup. The disk cartridge 222 includes a shutter 230 which has a C shape in cross section for opening and closing the two openings 228 and 229 at a time at both surfaces of a cartridge body 205. More particularly, the shutter 230 has a slide guide tab 230a mounted to the proximal end thereof so that the shutter 230 can slide in both directions denoted by the arrows A and B in FIGS. 3 and 4 to open and close the two openings 228 and 229 with its slide guide tab 230b engaging with a slide guide recess 210.

Figure 5:
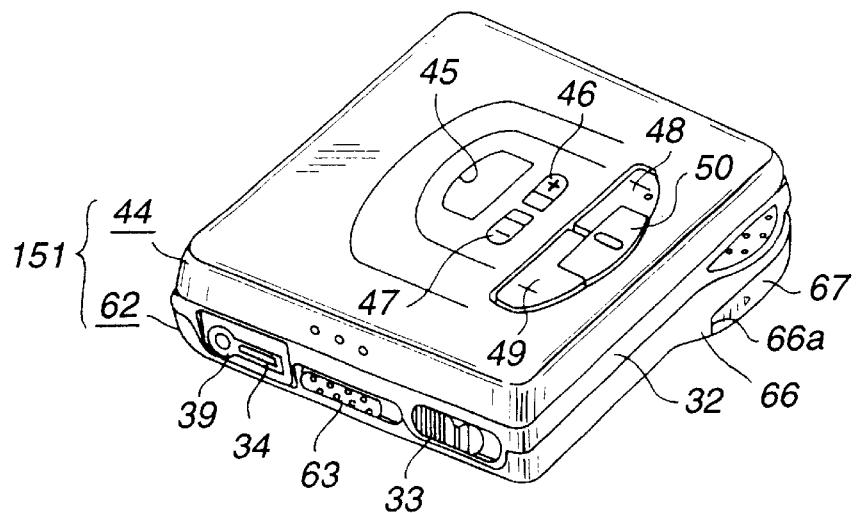
FIG. 5 is a perspective view showing a disk player as an electronic apparatus of the present invention.
Figure 6:
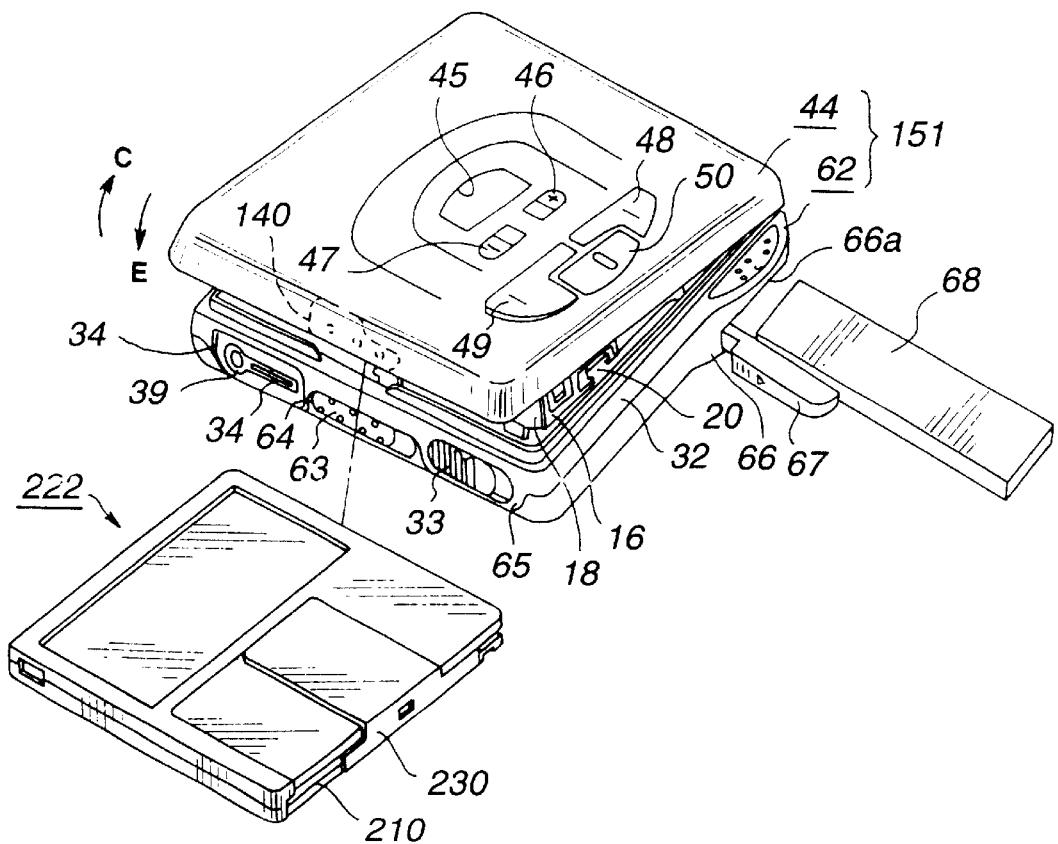
FIG. 6 is a perspective view of the disk player where a disk cartridge and a secondary cell are to be loaded.

The disk cartridge 202 of playback type and the disk cartridge 222 of record/playback type described above are used as the recording mediums in a disk player of the present invention. As shown in FIGS. 5 and 6, the disk player of the present invention has a housing 151 composed of a lower half 62 serving as a main body and an upper half 44 serving as a cover for closing the opening of the lower half 62. The housing 151 accommodates a framework 22 of a four-sided shape as shown in FIG. 7.

Figure 7:
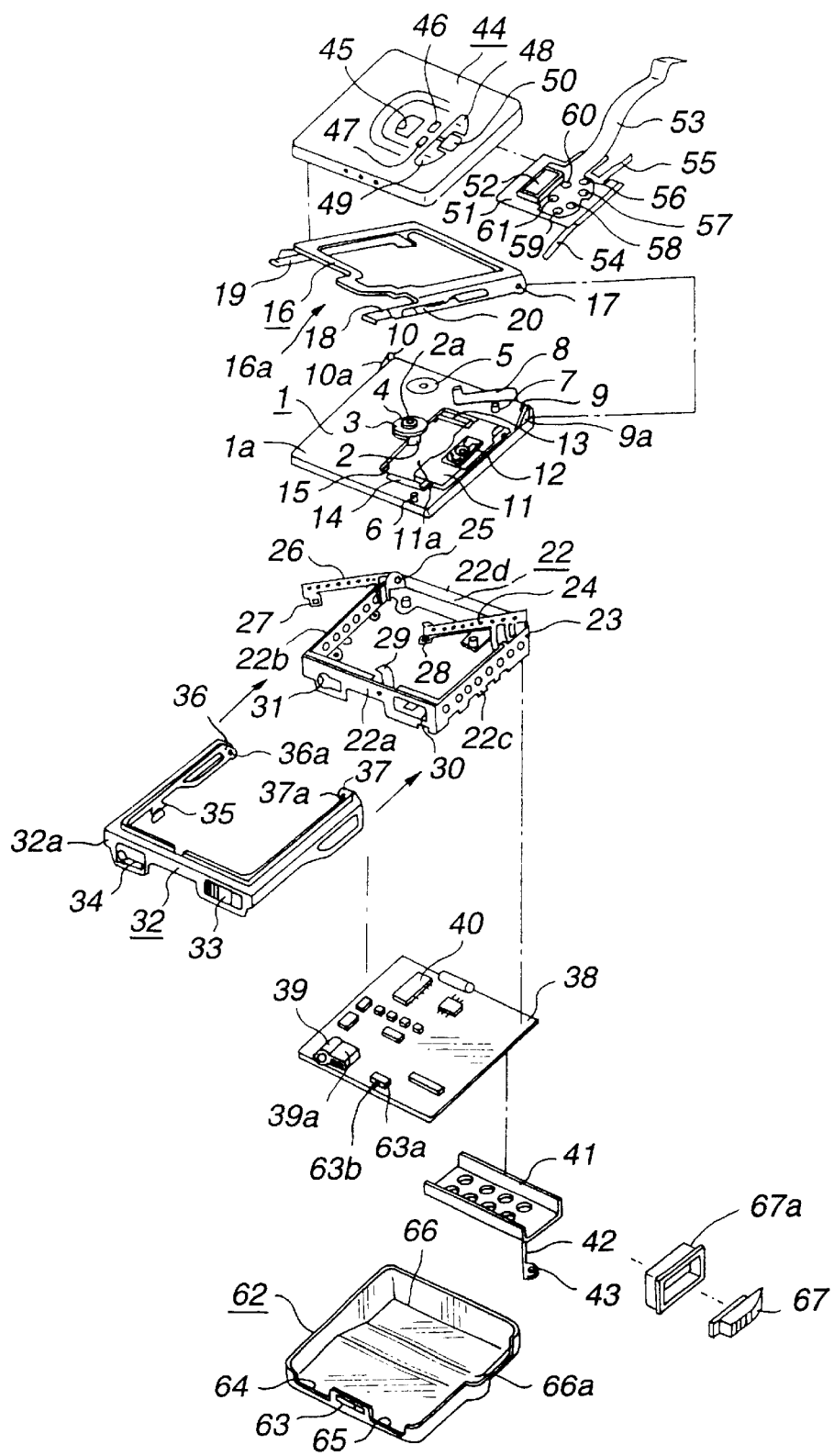
FIG. 7 is an exploded perspective view of the disk player of the present invention.

The lower half 62 is formed of a four-sided housing shape with its lower surface opened up as shown in FIGS. 7, 8, 9, and 10. The open upper surface of the lower half 62 is tailored for loading and unloading of the disk cartridge 202 or 222 into a disk player unit of the lower half 62. A C shaped narrow strip 32 is mounted from the open upper surface in the lower half 62 so that it extends from the front side to two opposite sides at a right angle to the front side in the lower half 62, as shown in FIG. 7.

Figure 11:
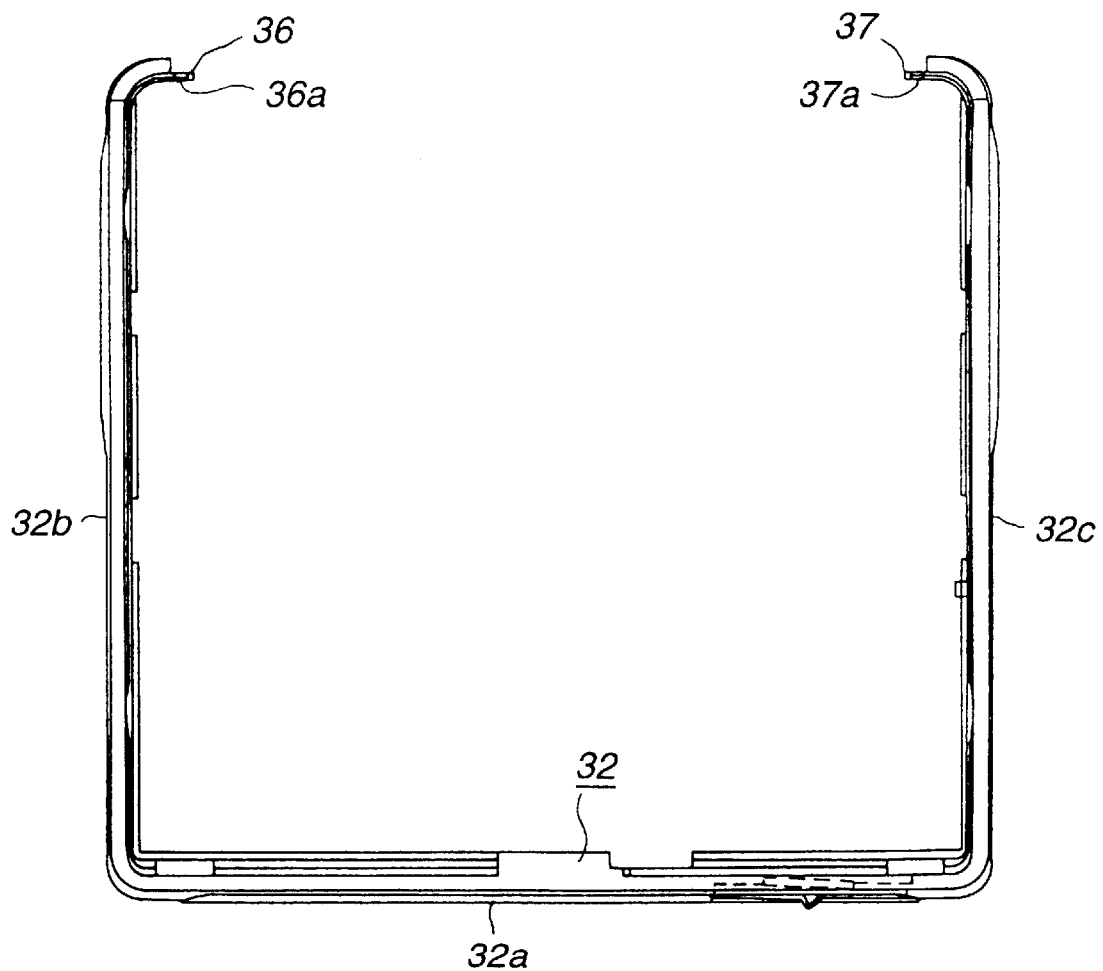
FIG. 11 is a plan view of a strip as a member of the apparatus.
Figure 12:
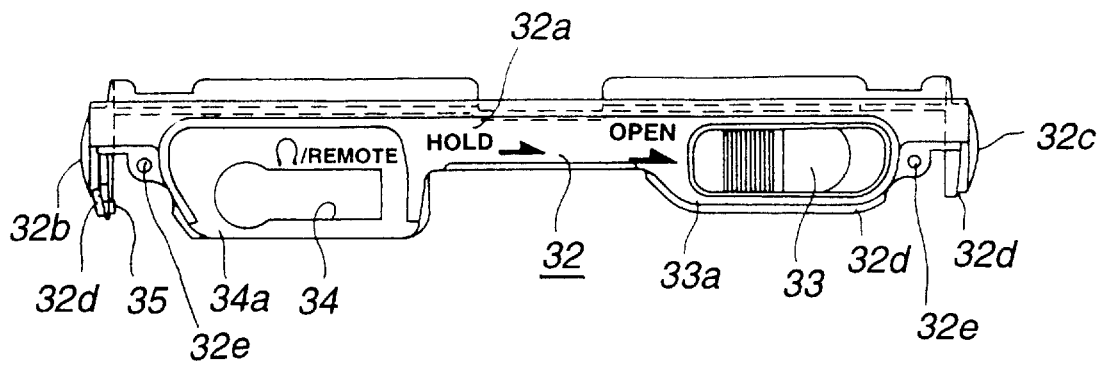
FIG. 12 is a front view f the strip.

The strip 32 may be fabricated by mold forming of a synthetic resin material and comprises a front wall 32a and a pair of side walls 32b and 32c extending at a right angle from the front side 32a, thus forming substantially a C shape, as shown in FIGS. 11 and 12. The C shaped strip 32 has no rear wall arranged opposite to the front wall 32a and will thus be deflected easily. In particular, the two opposite side walls 32b and 32c are susceptible to deformation. Even if the strip 32 of the synthetic resin material is stressed, it can readily be restored to its original shape without difficulty. The strip 32 is seated on the lower half 62 with its engaging step 32d provided along the lower edge of the strip 32 and coupled to the upper edge of the lower half 62, as shown in FIG. 12.

Figure 10:
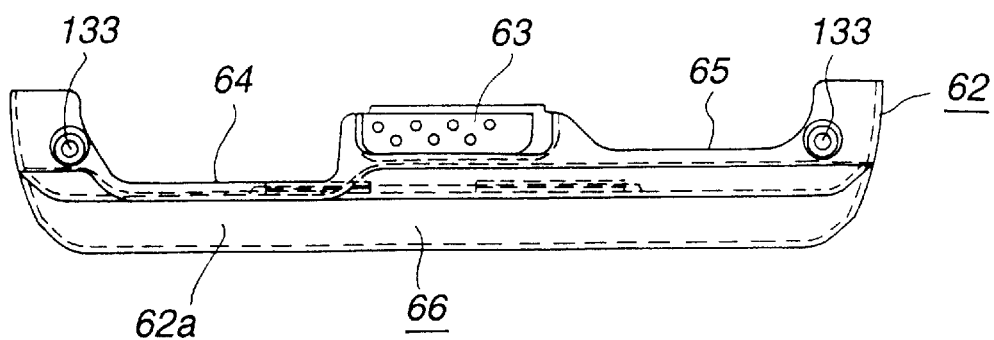
FIG. 10 is a front view of the lower half.
Figure 13:
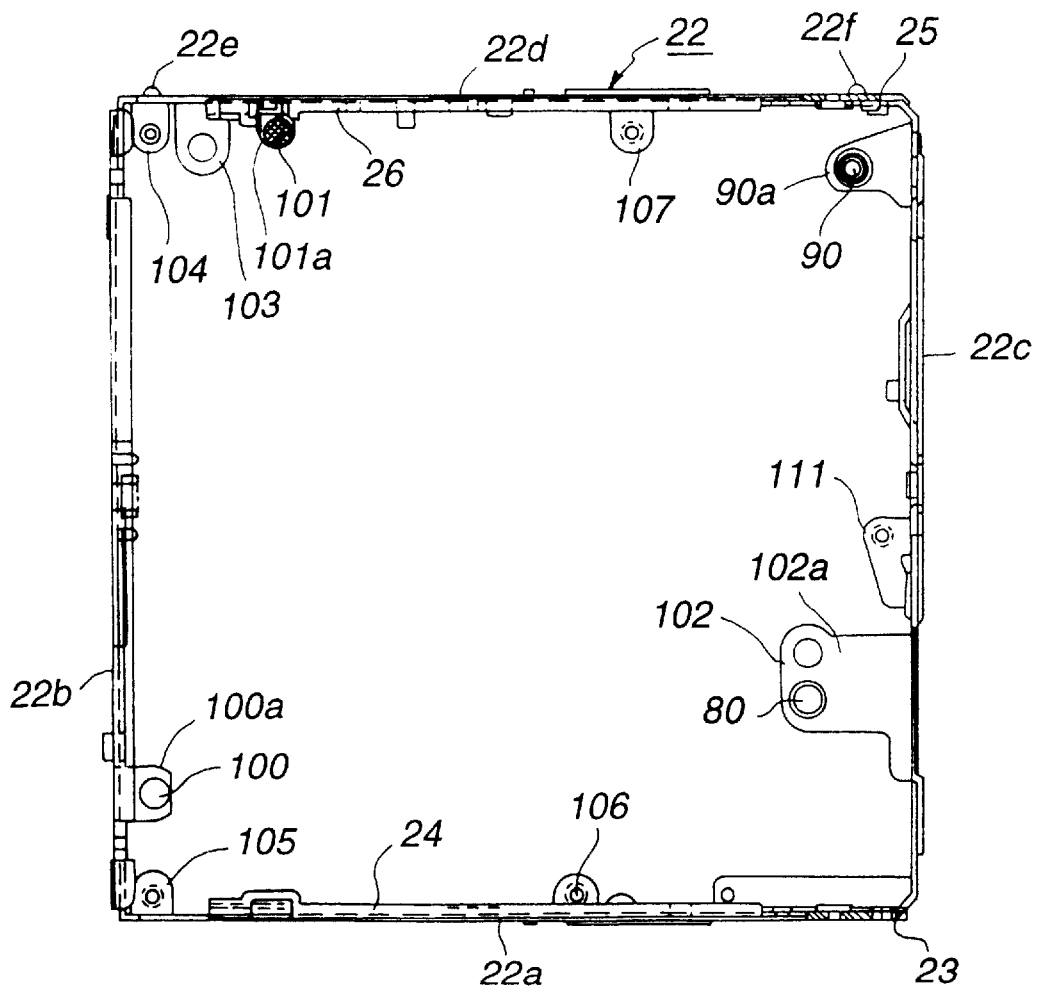
FIG. 13 is a plan view of a framework as a member of the apparatus.
Figure 16:
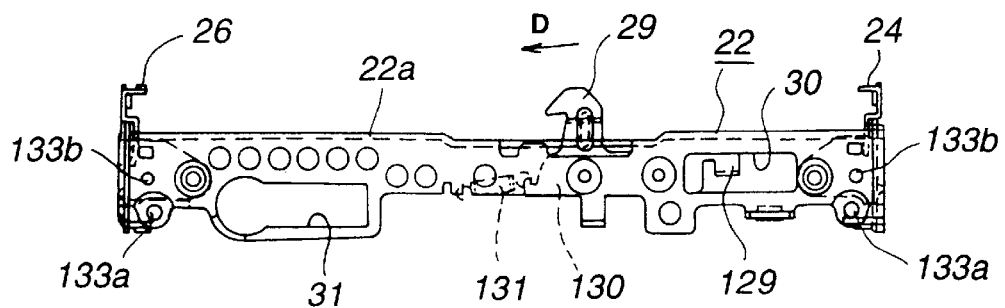
FIG. 16 is a front view of the framework.

The framework 22 mounted in the lower half 62 of the housing 151 is fastened to the lower half 62 by screws, not shown, threaded through screw holes 133, shown in FIG. 10, provided in both ends of the front wall 62a of the lower half 62 into screw holes 133a, shown in FIG. 16, provided in both ends of a front wall 22a of the framework 22. The framework 22 may be fabricated by folding a metal strip of e.g. stainless steel into a four-sided shape, as shown in FIGS. 7 and 13. The framework 22 is joined to the inner side of the C shaped strip 32 so that its front wall 22a and two opposite side walls 22b and 22c at a right angle to the front wall 22a extend along the inner side of the strip 32.

The two opposite side walls 32b and 32c of the C shaped strip 32 have projections 36 and 37 provided respectively at one end thereof and extending parallel to the front wall 32a, as shown in FIG. 11. As best shown in FIG. 7, a couple of engaging holes 36a and 37a are provided in the projections 36 and 37 for engagement with engaging protrusions 22e and 22f, shown in FIG. 13, formed on the rear wall 22d of the framework 22. The strip 32 is joined to the outer side of the front wall 22a and the side walls 22b and 22c of the framework 22 with its engaging holes 36a and 37a accepting the protrusions 22e and 22f of the rear wall 22d of the framework 22 and also, with engaging holes 32d and 32e, shown in FIG. 12, provided in its front wall 32a accepting protrusions 113b provided adjacent to the screw holes 133a on both ends of the front wall 22a of the framework 22.

In case that the strip 32 joined to the framework 22 with its engaging holes 36a, 37a, 32d, and 32e accepting the engaging protrusions 22e, 22f, and 133b of the framework 22 respectively as substantially fitted into the lower half 62 is stressed by an external impact, it will be deformed itself with its engaging holes 36a, 37a, 32d, and 32e disengaging from the protrusions 22e, 22f, and 133b thus minimizing transmission of the impact to the framework 22. More specifically, when the strip 32 is deformed by any stress, it may dislocate relative to the framework 22 and prevent the framework 22 and the lower half 62 supporting the framework 22 from being stressed directly, hence avoiding any unwanted load over e.g. a base plate 1 mounted to the framework 22.

Figure 14:
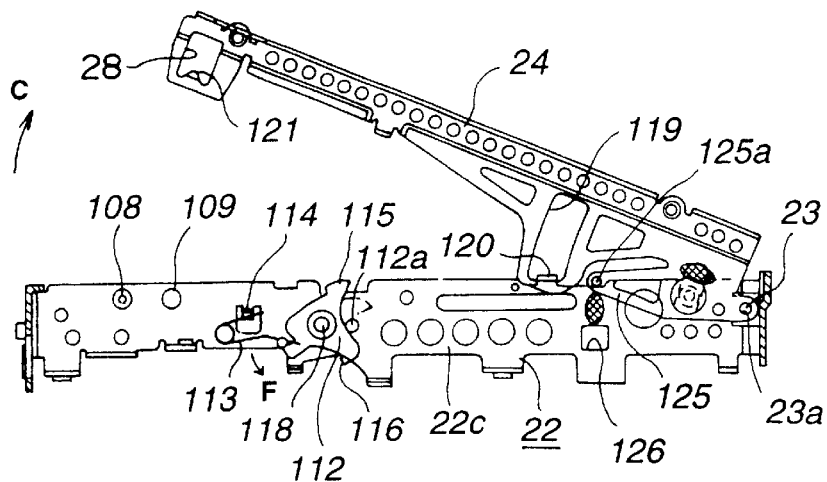
FIG. 14 is a right side view of the framework with an pivotal arm mounted thereon.
Figure 15:
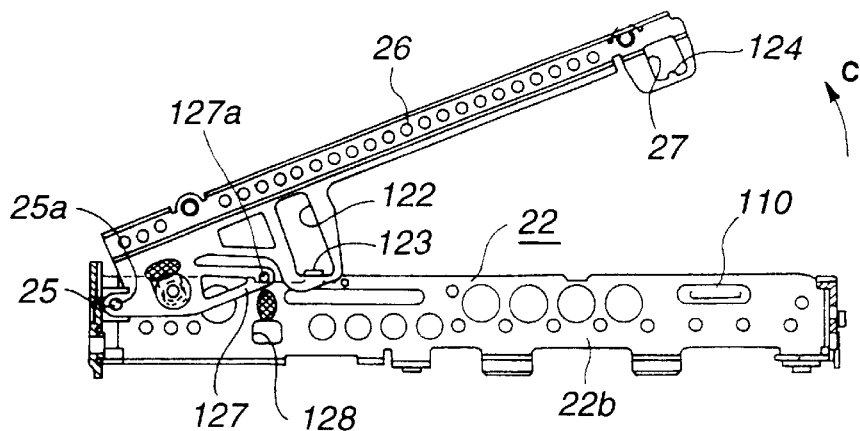
FIG. 15 is a left side view of the framework with an pivotal arm mounted thereon.

A pair of left and right pivotal arms 24 and 26 are mounted to the two, left and right, side walls 22b and 22c of the framework 22 respectively supported by the strip 32, as shown in FIGS. 7, 14, and 15. The pivotal arms 24 and 26 is joined to the framework 22 by pivots 23 and 25 extending to the rear side 22d of the side walls 22b and 22c of the framework 22 across pivot holes 23a and 25a provided in the proximal ends of their respective pivotal arms 24 and 26 so that they can move about the pivots 23 and 25 respectively. The pivotal arms 24 and 26 have slits 119 and 122 of an arcuate shape provided therein and extending about the pivots 23 and 25 respectively. The arcuate slits 119 and 122 are shaped for accepting pivotal motion limiters 120 and 123 projected on the upper surfaces of the side walls 22b and 22c of the framework 22 respectively. While the pivotal arms 24 and 26 are turned to depart from the framework 22 in the direction denoted by the arrow C in FIGS. 14 and 15, their pivotal movements are restricted by the pivotal motion limiters 120 and 123.

The pivotal arms 24 and 26 have spring portions 125 and 127 provided on the proximal ends thereof and equipped with projections 125a and 127a extending outwardly from the distal ends of the spring portions 125 and 127 respectively, as shown in FIGS. 14 and 15. As the pivotal arms 24 and 26 are turned towards the framework 22, their projections 125a and 127a come into engagement with corresponding engaging holes 126 and 128 provided in the side walls 22b and 22c of the framework 22 respectively thus to limit the pivotal movements of the pivotal arms 24 and 26. When the pivotal arms 24 and 26 are turned to depart from the framework 22 in the direction denoted by the arrow C in FIGS. 14 and 15, their spring portions 125 and 127 deflect inwardly of the framework 22 due to their elastic deformation and release the projections 125a and 127a from the engaging holes 126 and 128.

The upper half 44 of the housing is fixedly joined at lower ends by screws, not shown, to the two pivotal arms 24 and 26 pivotably mounted to the framework 22. This allows the upper half 44 secured to the two pivotal arms 24 and 26 pivotably mounted to the framework 22 installed in the lower half 62 to be turned together with the two pivotal arms 24 and 26 about the pivots 23 and 25 for opening and closing of the upper surface of the lower half 62.

When the upper half 44 has seen turned to the lower half 62 for closing, it comes in direct contact with the lower half 62 forming the housing 151 as shown in FIG. 5 and covering the framework 22 from upper and lower. The upper half 44 and the lower half 62 may be made of a conductive, light weighted metal material such as aluminum.

Figure 17:
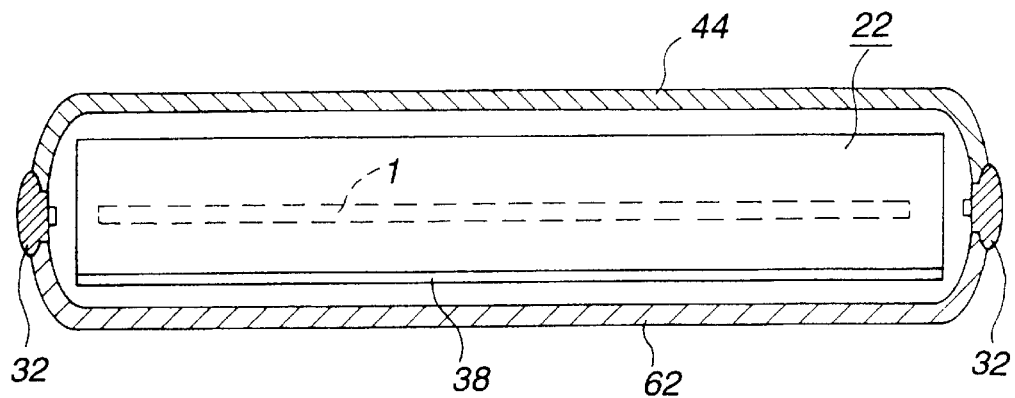
FIG. 17 is a cross sectional view of a housing composed of the lower half, the strip, and an upper half joined to each other.

When the upper half 44 and the lower half 62 are joined to each other, the strip 32 extending along the outer walls of the framework 22 in the lower half 62 is sandwiched between the upper half 44 and the lower half 62 as shown in FIG. 17. The strip 32 sandwiched between the upper half 44 and the lower half 62 can absorb by deformation any impact applied to the housing 151 thus preventing physical injury.

As the upper half 44 has been joined to the lower half 62 for closing the housing 151, it is locked to the framework 22 by a lock mechanism. A lock lever 130 is slidably mounted to the front wall 22a of the framework 22 as shown in FIG. 16. The lock lever 130 has a lock flap 29 thereof extending upwardly of the framework 22. An engaging member 140 for engagement with the lock flap 29 is mounted to substantially the center of the front side of the upper half 44 as best shown in FIG. 6. When the lock lever 130 engages at its lock flap 29 with the engaging member 140, it causes the upper half 44 to be joined directly to the lower half 62 and maintains the lower half 62 at its closing state of the upper surface shown in FIG. 5. The lock lever 130 also has at one end a knob mounting tab 129. A slider knob 33 for sliding movement along the front wall 32a of the strip 32 is mounted to the knob mounting tab 129 as shown in FIG. 12. The lock lever 130 remains urged in the direction denoted by the arrow D in FIG. 16 for driving the lock flap 29 to engage with the engaging member 140 by means of a tension coil spring 131 mounted between the lock lever 130 and the front wall 22a of the framework 22.

The knob mounting tab 129 of the lock lever 130 is arranged to extend across a through hole 30 provided as a notched shape in the front wall 22a of the framework 22 to a front surface 32a of the strip 32 joined directly to the front wall 22a.

When the slider knob 33 is slid in the direction denoted by the arrow D in FIG. 16 as resisting against the urging force of the tension coil spring 131, the lock lever 130 disengages its lock flap 29 from the engaging member 140 and permits the upper half 44 to turn upward and depart from the lower half 62.

A first circuit board 38 having a size and a shape substantially equal to the plan view of the framework 22 and acting as a main circuit board with a degree of rigidity is mounted to the lower surface of the framework 22 installed in the lower half 62, as shown in FIG. 7. The first circuit board 38 for use as power and control circuits of the disk player may be fabricated by providing a pattern of wiring on an insulating substrate with a degree of rigidity and mounting electronic components 40 to corresponding locations of the pattern. The pattern of wiring includes grounding ports which are connected at one end to grounding potential sections of the electronic circuit and at the other end to the ground.

The first circuit board 38 of a four-sided shape is anchored by screws to circuit board mounting tabs 104, 105, 106, 107, and 111 provided inwardly at lower corner and center regions of the front wall 22a, the side walls 22b and 22c, and the rear wall 22d of the framework 22, as shown in FIG. 13, thus closing the framework 22 from lower. The screws for anchoring the first circuit board 38 to the framework 22 are extended through screw holes provided in the first circuit board 38 and threaded into the thread holes of their respective circuit board mounting tabs 104, 105, 106, 107, and 111.

The first circuit board 38 mounted to the lower side of the framework 22 is thus installed in the lower half 62 together with the framework 22.

Since the framework 22 made of a resilient metal strip folded into a four-sided shape is joined at the lower side with the first circuit board 38 having a degree of rigidity, it will be prevented from deflection and its mechanical strength will be increased.

Referring to FIG. 7, a battery holder frame 41 serving as a battery holder for storage of a secondary battery 68 which is a source of electric power for driving the disk player is mounted to the bottom of the first circuit board 38 in the framework 22. The battery holder frame 41 may be fabricated by folding a metal sheet to a C shape as shown in FIG. 7 and has a mounting arm 42 extending from one end thereof. A fastening tab 43 having a screw hole 43a therein is provided at the distal end of the mounting arm 42. The battery holder frame 41 is fixedly joined by a fastening screw screwed through the screw hole 43a of the fastening tab 43 to the first circuit board 38 with its one open end aligned to one end of the first circuit board 38 and its top abutting the first circuit board 48.

A guide member 67b which has a battery inlet 67a thereof provided for guiding the loading of the secondary battery 68 into the battery holder frame 41 is mounted to the open end of the battery holder frame 41. The guide member 67b may be made of a synthetic resin material and is fixedly mounted by fastening screws to the bottom of the first circuit board 38.

Though not illustrated, the first circuit board 38 includes terminal plates arranged opposite to the battery holder frame 41 joined to the first circuit board 38 for providing electrical contacts with the electrodes of the secondary battery 68 loaded in the battery holder frame 41. The terminal plates are electrically connected to the power circuit of the first circuit board 38.

As the first circuit board 38 has been mounted to the framework 22 and installed together with the framework 22 in the lower half 62, the battery holder frame 41 and guide member 67b mounted to the bottom of the first circuit board 38 are positioned in a battery storage 66 provided at the bottom of the lower half 62 extending downwardly, as shown in FIGS. 5, 6, and 7. The guide member 67b is closely fitted into a battery loading opening 66a provided in one side of the lower half 62.

A battery cover 67 is pivotably mounted at its proximal end to one side at the battery inlet 67a of the guide member 67b for opening and closing the battery loading opening 66a. When the secondary battery 68 has been loaded from the battery inlet 67a into the battery holder frame 41, it is securely held in the lower half 62 and prevented from being dropped off from the battery storage 66 by the battery cover 67 closing the battery inlet 67a.

The secondary battery 68 may be a rechargeable Ni—Cd cell or a lithium ion cell having a flat parallelopiped shape shown in FIG. 6.

The battery storage 66 bulged downwardly at the bottom of the lower half 62 may be so designed with its back raised and acting as a support so that when the disk player is placed on a flat level such as the top of a desk, its upper half 44 is tilted.

The framework 22 joined at the lower side with the first circuit board 38 is also coupled at the upper side to the base plate 1 on which the disk playback unit is mounted above the first circuit board 38. The shape of the base plate 1 is flat and four sided and substantially equal to that of the disk cartridge 202 of playback type shown in FIGS. 1 and 2 or the disk cartridge 222 of record and playback type shown in FIGS. 3 and 4. The base plate 1 may be made of a magnesium diecast alloy which is light in weight but has a proper degree of mechanical strength.

The base plate 1 is supported by support pins, not shown, mounted upright on two support flaps 102 and 103, which projects inwardly from the side wall 22c and the back wall 22d of the framework 22, and seated at the lower side on four dampers 80, 90, 100, and 101 mounted to the support flap 102 and three projection tabs 90a, 100a, and 101a respectively inwardly projecting from the side walls 22b and 22c and the back wall 22d of the framework 22, as shown in FIG. 13. This allows the base plate 1 to be displaced axially of the support pins within a range where the dampers 80, 90, 100, and 101 can follow.

A holder 16 for holding the disk cartridge 202 or 222 loaded to the disk player is mounted on the upper side of the base plate 1 supported by the framework 22. More particularly, the holder 16 is pivoted by a couple of pivots 9 and 10 which extend through pivot holes 17 provided in the proximal ends of the holder 16 and are joined to the opposite sides support flaps 9a and 10a mounted upright on both ends of the rear side of the base plate 1, as shown in FIG. 7, so that the holder 16 can turn about the pivots 9 and 10 to and from the base plate 1. Since the holder 16 is associated with the upper half 44, its pivotal movement about the pivots 9 and 10 is transmitted to the upper half 44.

As shown in FIGS. 14 and 15, engaging tabs 121 and 124 for engagement with corresponding engaging tabs, not shown, mounted to two distal ends of the holder 16 are provided on the distal ends of the pivotal arms 24 and 26 respectively which hold the upper half 44. When the upper half 44 is turned with the pivotal arms 24 and 26 about the pivots 23 and 25 to depart from the lower half 62 in the direction denoted by the arrow C in FIG. 6, the holder 16 moves upward with its unshown engaging tabs engaging with the corresponding engaging tabs 121 and 124. More specifically, the holder 16 is lifted through an angle of 18° to 22° from the base plate 1 supported by the framework 22 in the lower half 62 in the direction denote by the arrow C in FIG. 6.

When the upper half 44 is turned down in the direction denoted by the arrow E in FIG. 6 to approach the upper surface of the lower half 62, the unshown engaging tabs disengage from their respective engaging tabs 121 and 124.

As the upper half 44 has been turned and closes the upper surface of the lower half 62, the holder 16 is located directly on the base plate 1.

Referring to FIG. 14, an operating lever 112 for actuating a closing detection switch mounted on the first circuit board 38 for detection of the closing of the upper half 44 is mounted to substantially a center region of the side wall 22c of the framework 22. The operating lever 112 is pivotably joined to a pivot 118 mounted upright on the side wall 22c and remains urged in the direction denoted by the arrow F in FIG. 14 by a twisted coil spring 113 mounted to the side wall 22C. The pivotal movement of the operating lever 112 is limited by a pivotal motion limiting pin 112a. When the upper half 44 is turned down to close the upper surface of the lower half 62, the pivotal arm 24 joined to the upper half 44 presses down against a pressed portion 115 of the operating lever 112 which is then turned in an opposite direction to the direction denoted by the arrow F in FIG. 14 as resisting against the urging force of the coil spring 113. This causes a switching portion of the operating lever 112 to depress and turn on the closing detection switch on the first circuit board 38. The closing detection switch is connected to the control circuit, described later, provided on the first circuit board 38.

Figure 18:
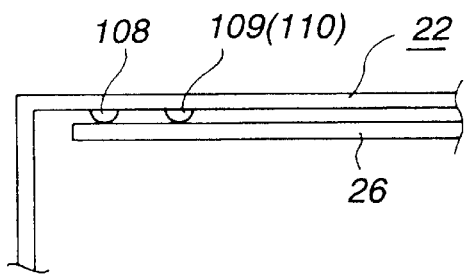
FIG. 18 is a plan view of a primary part showing the relation between the framework and a pivotal lever.

Also, a group of protrusions 108, 109, and 110 extending inwardly of the framework 22 are provided on the left and right side walls 22b and 22c and the front wall 22a of the framework 22, as shown in FIG. 18. While the pivotal arms 24 and 26 are being turned down towards the lower half 62, their sides where the engaging tabs 121 and 124 are provided are supported and guided by the protrusions 108, 109, and 110 in order to smoothly move into the lower half 62.

Figure 19:
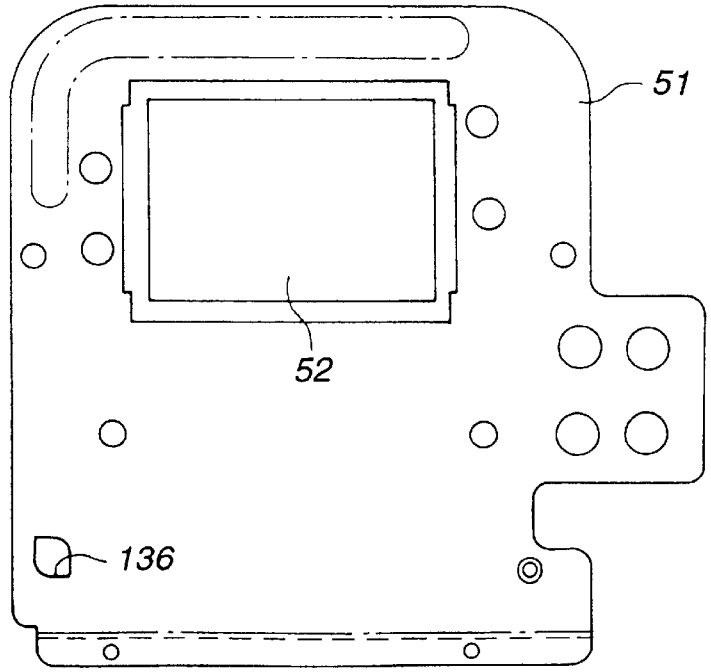
FIG. 19 is a plan view of a shield sheet supporting an LCD panel.

As shown in FIG. 7, a second circuit board 53 which may be a flexible printed circuit board is mounted to the inner side of the upper half 44. The second circuit board 53 is bonded to a shield sheet 51 joined by screws to the inner side of the upper half 44 so that it is sandwiched between the shield sheet 51 and the upper half 44. The shield sheet 51 is connected to a grounding potential port on the second circuit board 53. A liquid crystal display (LCD) panel 52 electrically connected to the second circuit board 52 is mounted on the shield sheet 51 as shown in FIG. 19. The LCD panel 52 is exposed with its display surface via an opening 45 provided in the upper half 44 to the outside of the upper half 44, as shown in FIGS. 5 and 6. The LCD panel 52 may display various information about the operations of the disk player.

Figure 20:
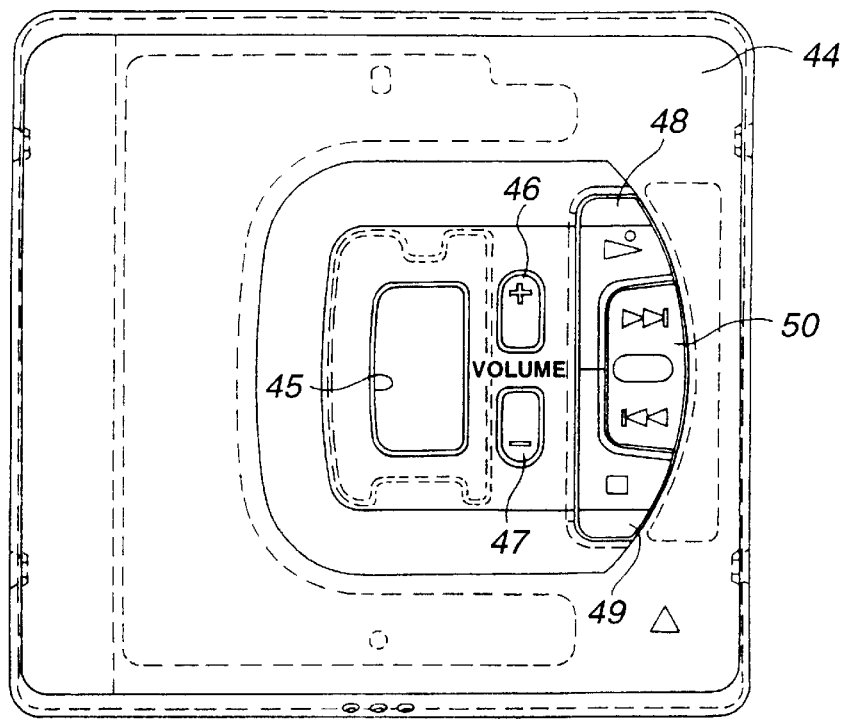
FIG. 20 is a plan view of the upper half.
Figure 21:
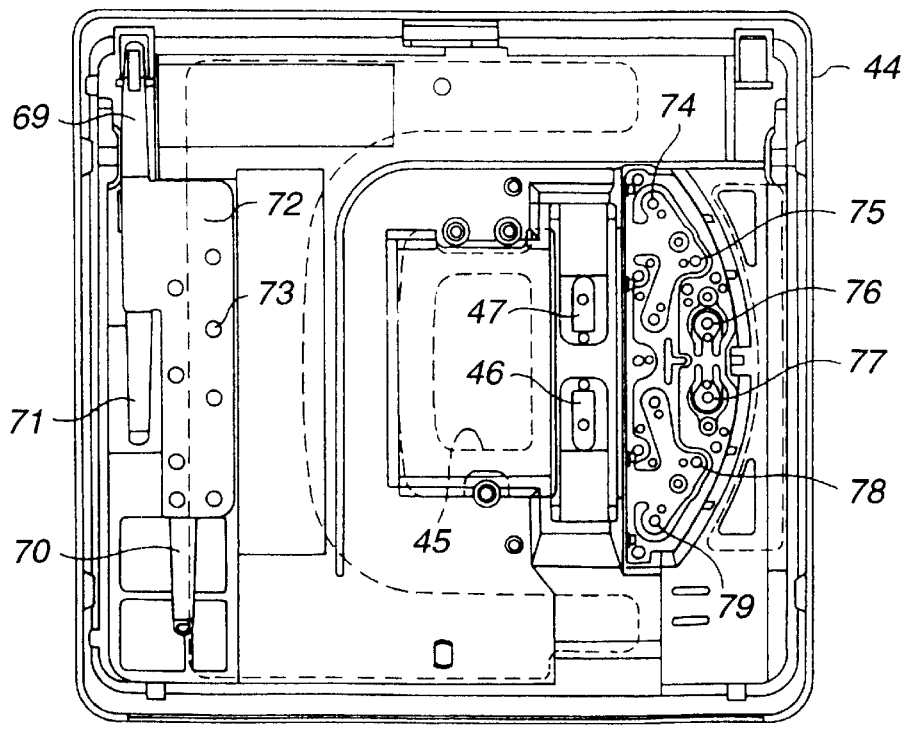
FIG. 21 is a bottom view of the upper half showing its inside.

A set of diaphragm switches 56, 57, 58, 59, 60, and 61 are mounted on the second circuit board 53 as shown in FIG. 7. The diaphragm switches 56, 57, 58, 59, 60, and 61 are actuated by pressing action of corresponding protrusions 74, 75, 76, 77, 78, and 79 respectively provided on the lower side of their respective buttonswitches 46, 47, 48, 49, and 50 arranged on the upper side of the upper half 44, as shown in FIGS. 20 and 21. The buttonswitches 46, 47, 48, 49, and 50 may function as a volume control switch, a play mode start switch, a stop switch, a forward skip switch, and a backward skip switch.

The control circuit is mounted together with an audio circuit on the first circuit board 38, which are energized by the rechargeable secondary cell 68 held in the battery storage 66 in the lower half 62 or a set of SUM3 or R6U type primary cells held in a battery pack which may be mounted to the rear side of the lower half 62. The control circuit is connected to the second circuit board 53. The control circuit is responsive to input signals produced by actuating the diaphragm switches 56, 57, 58, 59, 60, and 61 for driving the disk playback unit, described later, on the base plate 1. The audio circuit in responsive to control signals from the control circuit converts a digital signal of interest retrieved from the disk cartridge 202 or 222 into an analog signal which is transferred as an audio signal to a jack unit 39. The audio signal is further transmitted to an earphone or headphone connected to the jack unit 39 and perceived as acoustic sounds through the earphone or headphone.

The jack unit 39 is mounted on the first circuit board 38 as shown in FIG. 7. The jack unit 39 is inserted into a notch 31, shown in FIG. 16, provided in the front wall 22a of the framework 22 joined to the first circuit board 38 so that its front end is exposed to an opening 34, shown in FIG. 6, provided in the front wall 32a of the strip 32 joined to the front wall 22a of the framework 22

A connector 39a to which a connector plug for a remote controller is coupled is provided adjacent to the jack unit 39. The connector 39a is also inserted into the notch 31 provided in the front wall 22a of the framework 22 so that its front end is exposed via the opening 34 provided in the front wall 32a of the strip 32 to the outside of the housing 151.

As best shown in FIG. 12, the opening 34 in the front wall 22a of the strip 32 and the slide knob 33 for actuating the lock lever 130 are located in downwardly projecting portions 34a and 33a of the strip 32. The projecting portions 34a and 33a are tailored to fit into recesses 64 and 65 respectively, shown in FIG. 10, provided in the front wall 22a of the framework 22 when the strip 32 is joined to the outer side of the framework 22 as shown in FIG. 6.

A hold knob 63 for operating a hold switch 63a for maintaining the operating mode and state is provided on the front wall 62a of the lower half 62. The hold knob 63 is mounted to an operator 63b of the hold switch 63a secured to the first circuit board 38 and can be slid along the front side of the lower half 62 for switching on and off the hold switch 63a. The operator 63b of the hold switch 63a extends to the front side of the lower half 62 across notches provided at the lowermost in the front wall 32a of the framework 32 and the front wall 22a of the strip 32.

Figure 8:
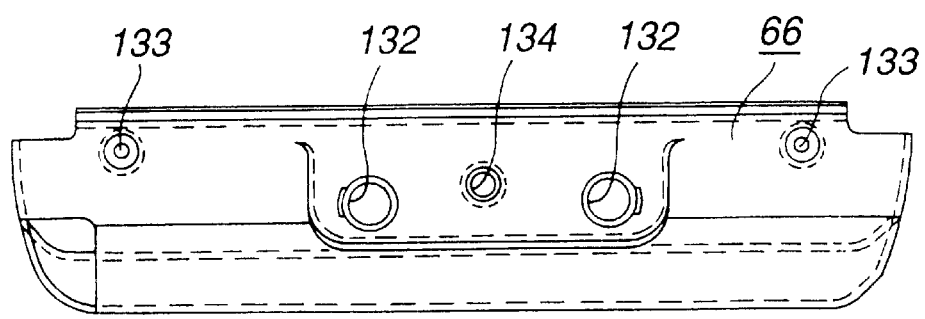
FIG. 8 is a back view of a lower half as a member of the apparatus.
Figure 9:
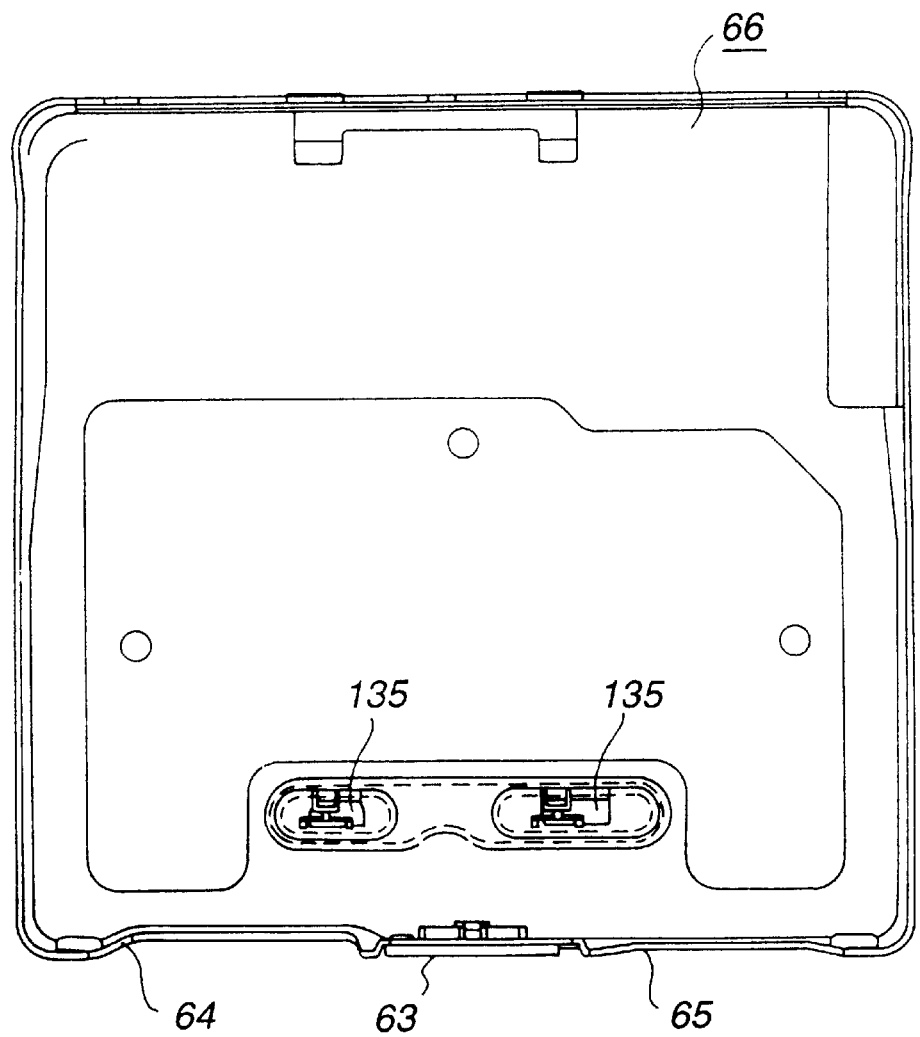
FIG. 9 is a plan view of the lower half showing its inside.

As shown in FIG. 8, a couple of through openings 132 are provided in the rear wall 62b of the lower half 62 for allowing connector terminals of the first circuit board 38 to be exposed. A screw hole 134 is also provided between, the two through openings 132 in the rear wall 62b of the lower half 62 for fastening the battery pack containing a set of the primary cells.

More specifically, the battery pack is mounted by a screw inserted in the screw hole 134 to the rear wall 62b of the lower half 62 with its positive and negative electrode ports extending through the openings 132 to corresponding connector terminals.

Figure 22:
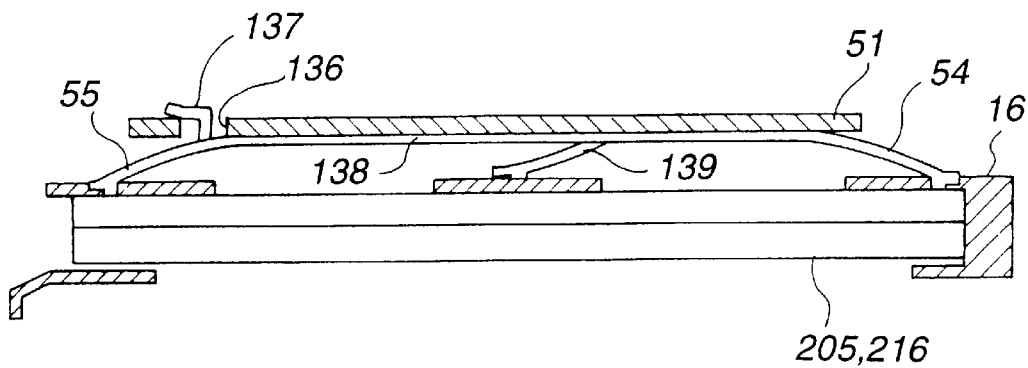
FIG. 22 is a longitudinal cross sectional view of the shield sheet, a grounding strip, and the disk cartridge connected in a combination to the ground.
Figure 23:
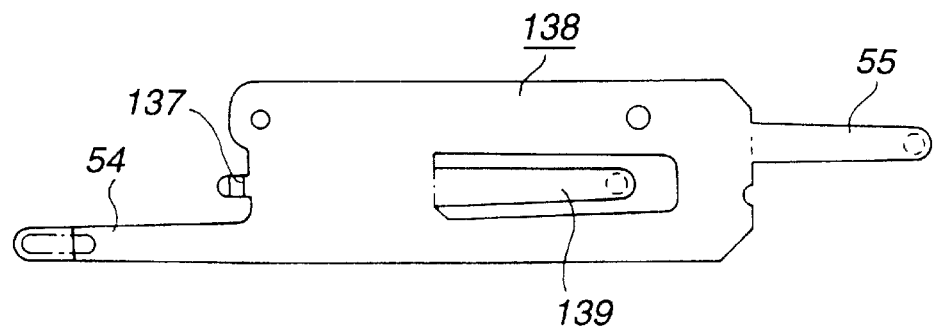
FIG. 23 is a plan view of a conductive strip mounted to the shield sheet.
Figure 24:
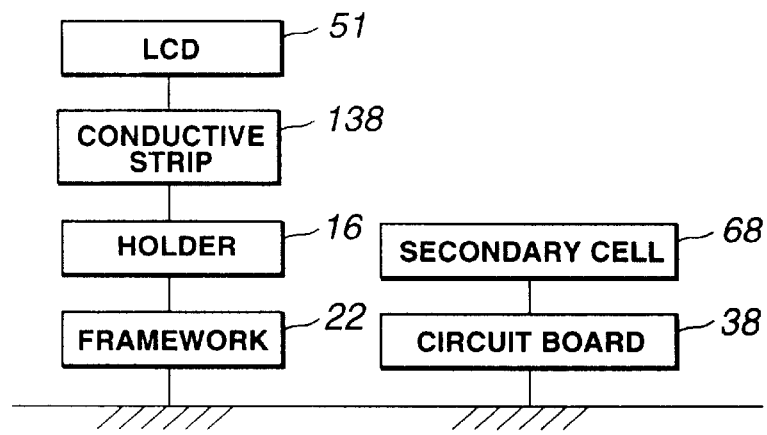
FIG. 24 is a block diagram showing a grounding connection in the disk player.

Referring to FIG. 22, a conductive strip 138 for grounding is electrically connected to the shield sheet 51 which supports the second circuit board 53 in the upper half 44. The conductive strip 138 may be made of an electrically conductive metal and extends along one side of the upper half 44. The conductive strip 138 has an engaging finger 137 thereof for engagement with an engaging hole 136 provided in the shield sheet 51 as shown in FIG. 23. The conductive strip 138 is bonded by an adhesive or the like to the lower side of the shield sheet 51 with its engaging finger 137 fitting into the engaging hole 136.

The conductive strip 138 also has a spring portion 139 for pressing the holder 16 located beneath the lower side of the upper half 44. The conductive strip 138 is electrically connected to the holder 16 with its spring portion 139 pressing against the upper side of the holder 16 as shown in FIG. 22. In the disk player, the conductive strip 138, the holder 16 made of an electrically conductive metal, and the framework 22 made of an electrically conductive metal in a combination permit electrical connection between the LCD panel 52 and the grounding potential port on the first circuit board 38. The grounding potential port on the first circuit board 38 is connected to a connector terminal which serves as a grounding potential port and is coupled to the negative electrode terminal of the secondary cell 68 held in the battery storage 66. The conductive strip 138 remains urged by its spring portion 139 to depart the upper half 44 from the upper surface of the lower half 62.

Moreover, the conductive strip 138 has two spring portions 54 and 55 thereof for pressing the disk cartridge 202 or 222 against the base plate 1 mounted in the lower half 62, as shown in FIG. 23.

As shown in FIG. 21, the upper half 44 has a leaf spring 72 mounted by screws 73 to one end of the lower or inner side or the lower half 62 facing side thereof, which is opposite to the end of the conductive strip 138, for pressing the disk cartridge 202 or 222 held in the holder 16 against the base plate 1. The leaf spring 72 has at both ends two pressing portions 69 and 70 thereof for pressing and supporting the disk cartridge 202 or 222.

When the disk cartridge 202 or 222 is loaded into the holder 16, it is urged at all the corners by the springs 54 and 55 and the portions 69 and 70 of the leaf spring 72 and thus held securely in the cartridge loading section on the base plate 1.

The leaf spring 72 also has a pressing portion 71 thereof for pressing against the holder 16. The pressing portion 71 of the lead spring 72 presses down the upper half 44 against the lower half 62.

Provided on the base plate 1 which is mounted to the framework 22 and installed in the lower half 62 forming a main body with the framework 22 are the cartridge loading section 1a for holding the disk cartridge 202 or 222 serving as the recording medium of the disk player and the playback unit for playback of a data signal retrieved from the optical disk 201 or 221 in the disk cartridge 202 or 222 during the rotation of the optical disk 201 or 221.

The base plate 1 equipped with the disk playback unit and mounted to the framework 22 in he lower half 62 can be a main body together with the framework 62.

The disk playback unit on the base plate 1 is now explained in more detail.

As shown in FIG. 7, a spindle motor 2 is mounted to substantially a center region of the lower side of the base plate 1 with its drive shaft extending upwardly. The drive shaft 2a of the spindle motor 2 extends across a through apertures provided in substantially a center region of the base plate 1 to above the base plate 1. The drive shaft 2a of the spindle motor 2 is joined to a disk table 3. The disk table 3 may be made of substantially a disk like shape of a synthetic resin material. The disk table 3 has a centering portion 4 provided on the upper side thereof for engagement with a center hole of the optical disk 201 or the optomagnetic disk 221 so that it can be aligned axially with the optical disk 201 or the optomagnetic disk 221. Also, a magnet is mounted to the top of the centering portion 4 of the disk table 3 for magnetically attracting the metal hub 207 of the disk. When the optical disk 201 or the optomagnetic disk 221 is placed on the disk table 3, its center hole is accepted in the centering portion 4 and simultaneously, its hub 207 is magnetically attracted by the magnet for correct positioning and holding. This also permits the center hole of the optical disk 201 or the optomagnetic disk 221 to be aligned with the axis of the drive shaft 2a of the spindle motor 2. When the spindle motor 2 is driven, the optical disk 201 or the optomagnetic disk 221 rotates together with the disk table 3.

An optical pickup 11 is mounted on the base plate 1. The optical pickup 11 includes an optical block where a laser diode as a light source, a photosensitive element such as a photo transistor, and other optical devices for directing a beam of light emitted from the laser diode to an objective lens 12 are installed. In action the beam of light emitted from the laser diode in the optical pickup 11 is directed through the objective lens 12 and focused on a signal recording layer of the optical disk 201 or the optomagnetic disk 221 placed on the disk table 3. Also, a reflection of the light reflected on the optical disk 201 or the optomagnetic disk 221 is passed through the objective lens 12 and an optical device and received by the optical block in the optical pickup 11 where it is translated by the photosensitive element to a data signal such as an audio signal recorded on the optical disk 201 or the optomagnetic disk 221.

As shown in FIG. 7, the optical pickup 11 is supported by a guide shaft 13 and a guide strip 14 mounted beside the spindle motor 2 on the base plate 1 and arranged for moving in radial directions along the optical disk 201 or the optomagnetic disk 221 placed on the disk table 3 as being guided by the guide shaft 13 and the guide strip 14. The movement of the optical pickup 11 is driven by a pickup driving motor 5 mounted to the lower side of the base plate 1.

The optical pickup 11 is located on the lower side of the base plate 1 and actuated with its objective lens 12 across an opening 11a provided in the base plate 1 so that it can face the optical disk 201 or the optomagnetic disk 221 placed on the disk table 3. In action, the optical pickup 11 is moved in the radial directions along the optical disk 201 or the optomagnetic disk 221 placed and rotated on the disk table 3 to scan the signal recording layer of the optical disk 201 or the optomagnetic disk 221 with its beam of light for reading a data signal of interest.

A pair of positioning pins 6 and 7 are mounted upright on the cartridge loading section 1a of the upper side of the base plate 1 for engagement with corresponding positioning holes 211 and 212 of the disk cartridge 202 or 222 loaded to the cartridge loading section 1a to determine the horizontal loading location of the disk cartridge 202 or 222. Also, a pair of height adjusting protrusions are provided in the cartridge loading section 1a for holding the disk cartridge 202 or 222 from a side opposite to the side where the positioning holes 211 and 212 are provided.

When the disk cartridge 202 or 222 is loaded into the cartridge loading section 1a, it is held with the positioning pins 6 and 7 and the height adjusting protrusions and can thus be positioned correctly in both the horizontal and vertical directions. Simultaneously, the optical disk 201 or 221 in the disk cartridge 202 or 222 is securely held on the disk table 3 and can be rotated without striking against the inner wall of the cartridge body 205.

Upon loading of the disk cartridge 202 or 222 into the cartridge loading section 1a, the cartridge loading detection switch mount ed on the base plate 1 is pressed and turned on by the cartridge body 205 thus detecting and indicating that the disk cartridge 202 or 222 has been loaded into the cartridge loading section 1a. At the same time, the identification aperture 224 of the cartridge 202 or 222 is examined by the identification switch mounted on the base plate 1 to identify the type of the disk cartridge 202 or 222. The cartridge loading detection switch and the identification switch both are connected to the control circuit provided on the first circuit board 38.

The holder 16 supported by the two pivotal arms 24 and 26 pivotably mounted to the base plate 1 and joined to the upper half 44 which serves as a cover for the lower half 62 will now be described in more detail.

The holder 16 may be fabricated by folding a metal sheet and is provided, as shown in FIGS. 6 and 7, with a top portion, two, left and right, side wall portions extending downwardly from both sides of the top portion, and support strips 18 and 19 folded inwardly of the lowermost of the side wall portions thus allowing the disk cartridge 202 or 222 to be inserted from the front and held securely.

As the disk cartridge 202 or 222 is inserted through a cartridge loading inlet 16a into the holder 16, it is held by the top portion at top, the left and right side wall portions at both sides, and the support strips 18 and 19 at bottom. While the disk cartridge 202 or 222 is exposed with substantially its entire lower side, its center hole 206, positioning apertures 211 and 212, and disk identification aperture 213 face downwardly of the holder 16.

The holder 16 has a shutter opening flap projected inwardly from an intermediate portion of one of the side walls thereof. When the holder 16 receives the disk cartridge 202 or 222, its shutter opening flap slides along the slide guide groove 210 and comes into direct contact with one end of the shutter 209 or 230. As the disk cartridge 202 or 222 is further inserted into the holder 16, the shutter 209 or 230 is displaced relative to the cartridge body 205 by the action of the shutter opening flap thus to clear the opening 208 or 228. A shutter closing flap 20 extending inwardly is provided on the front end of the other side wall of the holder 16 as shown in FIG. 7. When the holder 16 receives the disk cartridge 202 or 222, the shutter closing flap 20 engages with and holds a portion of the shutter 209 or 230 at its opening state for clearing the opening 208 or 228. When the disk cartridge 202 or 222 is ejected out from the holder 16, the shutter 209 or 230 is moved relative to the cartridge body 205 and returned to its closing state by the action of the shutter closing flap 20 thus to close the opening 208 or 228.

When the holder 16 joined to the upper half 44 for movement with the upper half 44 is turned in the direction denoted by the arrow C in FIG. 6 to depart from the lower half 62, its cartridge inlet 16a is suspended between the upper half 44 and the lower half 62. As the disk cartridge 202 or 222 has been inserted through the cartridge inlet 16a into the holder 16, the holder 16 is turned back in the opposite direction denoted by the arrow E in FIG. 6 together with the upper half 44 towards the lower half 62. This allows the disk cartridge 202 or 222 held in the holder 16 to be positioned at the cartridge loading section 1a on the base plate 1. The disk cartridge 202 or 222 loaded in the cartridge loading section 1a is pressed down against the base plate 1 by the urging force of the springs 54 and 55 and the pressing portions 69 and 70 of the leaf spring 72 which are mounted to the inner side of the upper half 44.

An eject lever 8 for ejecting the disk cartridge 202 or 222 from the holder 16 is mounted on the upper side of the base plate 1 where the cartridge loading section 1a is located, which can be actuated when the holder 16 is turned in the direction denoted by the arrow C in FIG. 6 to depart from the base plate 1. As shown in FIG. 7, the eject lever 8 is joined at the proximal end to a pivot mounted upright on the base plate 1 for pivotal movement about the pivot and remains urged for movement with its distal end inwardly of the holder 16 by a spring not shown.

When the disk cartridge 202 or 222 is inserted into the holder 16, it presses and turns the eject lever 8 as resisting the urging force of the spring. The eject lever 8 then comes into engagement with an engaging member mounted on the back side of the base plate 1 and is maintained at a retracted position outside the cartridge loading section 1a.

When the holder 16 with the disk cartridge 202 or 222 is turned in the direction denoted by the arrow C in FIG. 6 to depart from the base plate 1, the eject lever 8 disengages from the base plate 1 and is turned towards the cartridge loading section 1a by the urging force of the spring. This causes the cartridge 202 or 222 to be pressed outwardly and unloaded from the holder 16.

Figure 25:
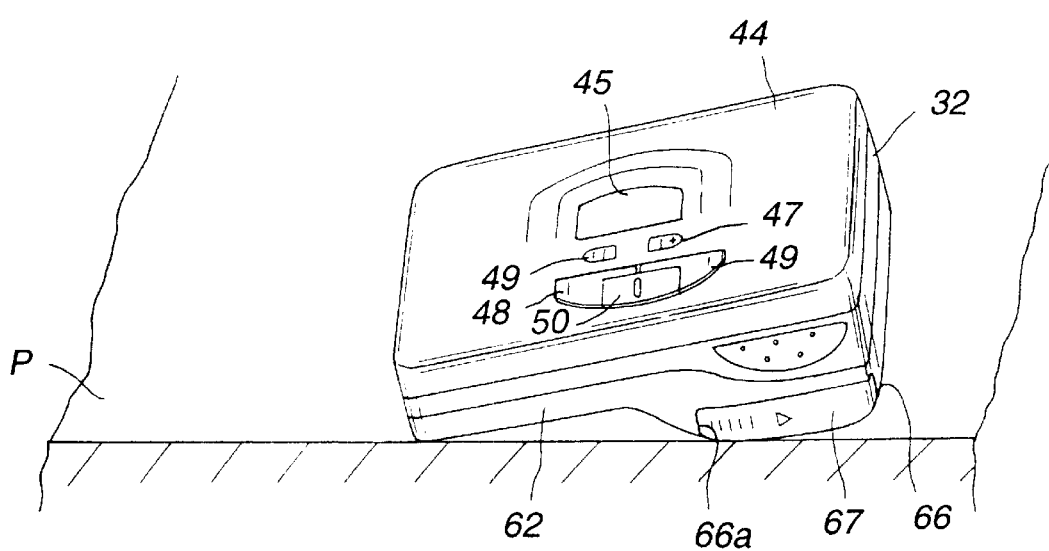
FIG. 25 is a perspective view of the disk player of the present invention placed at a given location.

As shown in FIGS. 5, 6, and 7, the disk player described above has the battery storage 66 bulged downwardly from the back side of the lower half 62. When the disk player is placed on a level P such as the top of a desk with the back side of its lower half 62 facing down as shown in FIG. 25, the upper side of the upper half 44 tilts down from the back to the front. Accordingly, the LCD panel 52 of the upper half 44 comes in the front of the user who can thus read its display with much ease. Also, the buttonswitches 46, 47, 48, 49, and 50 mounted on the upper side of the upper half 44 are allowed to be easily operated.

A procedure of operating the disk player of the present invention is now explained.

In a stop mode of the disk player with the disk cartridge 202 or 222 not loaded in the holder 16, the cartridge loading detection switch on the base plate 1 is inactivated and the control circuit on the first circuit board 38 disables the disk playback unit regardless of the action of any of the buttonswitches 46, 47, 48, 49, and 50. At the time, the eject lever 8 stays in the cartridge loading section 1a as being urged by the spring.

Upon being connected to the power source, the control circuit on the first circuit board 38 examines whether any of the buttonswitches 46, 47, 48, 49, and 50 is switched on or not. When the control circuit detects the switching on of the cartridge loading detection switch after any of the buttonswitches 46, 47, 48, 49, and 50 is turned on, it determines that the disk cartridge 202 or 222 is loaded in the cartridge loading section 1a and then examined whether or not the upper half 44 is turned down towards the lower half 62 and shuts off the opening side of the lower half 62. When it judges that the upper half 44 closes down the lower half 62, the control circuit operates and controls the disk playback unit according to the action of the buttonswitches 46, 47, 48, 49, and 50.

For loading the disk cartridge 202 or 222 onto the disk player, the upper half 44 is turned up in the direction denoted by the arrow C in FIG. 6 to move the holder 16 away from the lower half 62. Then, the diskcartridge 202 or 222 is loaded from front through the cartridge inlet 16a into the holder 16 with the disk cartridges 220 and 221. The upper half 44 and its holder 16 with the disk cartridge 202 or 222 loaded in are then turned down in the direction denoted by the arrow E in FIG. 6 towards the lower half 62. As the upper half 44 has shut off the upper side of the lower half 62, the disk cartridge 202 or 222 is precisely located in the cartridge loading section 1a of the base plate 1. Simultaneously, the disk cartridge 202 or 222 presses down the cartridge loading detection switch. As the control circuit detects that the disk cartridge 202 or 222 has been loaded in the cartridge loading section 1a, it enables the action of the buttonswitches 46, 47, 48, 49, and 50 hence permitting the disk playback unit to be ready for the operation. When the disk playback unit is activated, the data signal of interest such as an audio signal saved in the optical disk 201 or 221 in the disk cartridge 202 or 222 can be retrieved and played back.

When the playback of the data signal of interest has been finished, the disk cartridge 202 or 222 is ejected by turning the upper half 44 in the direction denoted by the arrow C in FIG. 6 to depart from the lower half 62 to move the holder 16 away from the disk playback unit. More specifically, as the holder 16 moves in the direction denoted by the arrow C in FIG. 6 to depart from the cartridge loading section 1a, the eject lever 8 is disengaged from the base plate 1 and turned towards the cartridge loading section 1a by the urging force of the spring thus pressing out the disk cartridge 202 or 222 from the disk inlet 16a. When the disk cartridge 202 or 222 is partially exposed from the holder 16, it can be unloaded from the holder 16 by pulling out its exposed portion.

Although the foregoing description of the present invention has been made in the form of a display player using the disk cartridge 202 or 222, the present invention is also applicable to a disk record/playback apparatus capable of recording data signals onto a recording medium such as an optical disk, a record player and a video tape recorder using magnetic tapes as the recording mediums, a video camera, and any other electronic apparatus with equal success of having the same advantages as of the above mentioned disk player.

Moreover, the present invention is applicable to a mobile or portable electronic apparatus such as a radio receiver with equal success.

INDUSTRIAL APPLICABILITY

As set forth above, the electronic apparatus according to the present invention comprises an upper half, a lower half, a framework, and a circuit board having a size substantially identical to that of the framework and a degree of rigidity enough to be mounted to one side of the framework. The upper half and the lower half are arranged so as to sandwich and enclose the framework therebetween. Since the circuit board with a degree of rigidity is mounted to the framework, the rigidity and physical strength of the framework will be increased.

Also, the apparatus for recording and/or playing back on a recording medium according to the present invention includes a first circuit board equipped with a grounding potential unit and a second circuit board connected to the first circuit board which both are electrically shielded by a cover member equipped with a shielding material connected to the grounding potential unit. Accordingly, the shielding material remains connected to the ground through a grounding line thus preventing a primary part of the apparatus from being statically charged.

What is claimed is:

1. A recording medium record and/or playback apparatus comprising:

a record and/or playback unit having a first circuit board provided with a grounding potential unit;

a cover body pivotably mounted to the record and/or playback unit and including a shield member connected to the grounding potential unit and a second circuit board connected to the first circuit board, the shield member being disposed between the first circuit board and the second circuit board;

a holder made of a metallic material and arranged to travel between the location for loading a recording medium into the record and/or playback unit and the location spaced away from the record and/or playback unit as the cover body is pivotably moved; and a grounding member made of a metallic material, provided with an engagement with the shield member and a contact for coming into direct contact with the holder, and connected to the shield member to urge the cover body in a direction of the holder pivotably turning.

2. A recording medium record and/or playback apparatus according to claim 1, wherein the grounding member has a pressing portion thereof for pressing the recording medium against the record and/or playback unit.

3. A recording medium record and/or playback apparatus according to claim 1, wherein the cover body has a window and at least one operating buttonswitch mounted thereon, and the second circuit board has at least one switch actuated by the action of the operating buttonswitch and a display element provided opposite to the window.

* * * * *